Sept. 24, 1935.   R. I. BODENLOS   2,015,585
PISTON SEALING MEANS
Filed Feb. 20, 1933

INVENTOR:
ROBERT I. BODENLOS
ATTORNEYS

Patented Sept. 24, 1935

2,015,585

UNITED STATES PATENT OFFICE 2,015,585

PISTON SEALING MEANS

Robert I. Bodenlos, Cleveland, Ohio, assignor to The American Ship Building Company, Cleveland, Ohio, a corporation of New Jersey Application February 20, 1933, Serial No. 657,493

5 Claims. (Cl. 309—47)

This invention relates to improved sealing means which is especially suited for use on various forms of pistons, including power pistons and valve pistons for preventing fluid leakage around the piston.

An object of the present invention is to provide improved piston sealing means wherein adjustable sealing-ring retaining means is normally biased in a direction to take up looseness for preventing leakage of fluid past the edge faces of the sealing ring.

Another object of this invention is to provide improved piston sealing means wherein an adjustable follower forms one wall of the groove or recess in which the piston sealing ring is mounted, and wherein such follower is normally biased toward the other wall of the sealing ring groove for taking up looseness, due to wear or other causes, and thereby maintaining a tight fit at the edges of the ring.

It is also an object of this invention to provide a novel form of joint for a piston sealing ring.

A further object of this invention is to provide an improved piston ring having a clearance space between adjacent ends thereof and a groove in the surface of the ring communicating with such clearance space, and wherein a member spanning the joint formed by the ring ends is provided with an opening therethrough connecting the clearance space with the annular recess back of the ring.

Other objects and advantages of this invention will be apparent from the following description, when taken in conjunction with the accompanying sheet of drawings, wherein Fig. 1 is a side elevational view of a piston structure embodying my improved sealing means, with parts thereof in section.

Figure 1:
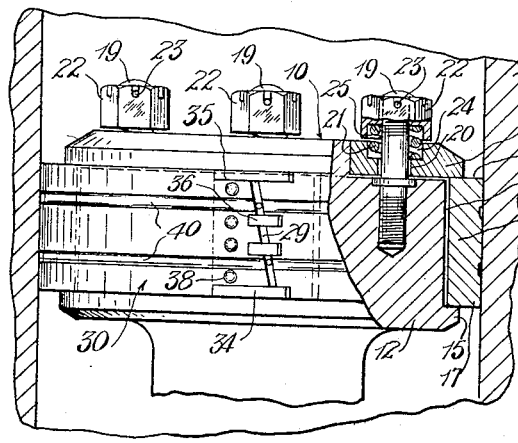

Detailed reference will now be made to the accompanying drawing wherein I have illustrated the improved piston sealing means of my invention. Before proceeding with such detailed description, it will be understood, of course, that the drawing is intended to be illustrative only and that the invention is not necessarily limited to the particular structural embodiments illustrated in this instance.

In Fig. 1 of the drawing I have shown my improved sealing means as applied to a piston 10 which is arranged for reciprocation in a cylinder 11. This piston may be a power piston, a valve piston, or any other form of piston on which an efficient sealing means is needed to prevent leakage of fluid past the piston.

The piston illustrated in this instance is in the form of a metallic body 12, having an annular groove 13 in which my improved sealing ring 14 is mounted for sliding cooperation with the inner surface of the wall of the cylinder. The piston body may be of any appropriate size and shape, depending upon the service it is to render, and is here shown as having an integral flange portion or abutment 15 which forms one side wall or edge of the piston ring groove. The other side wall of the groove is formed by the piston ring retaining member 16, which is commonly referred to as a follower.

According to my invention, the follower 16 is adjustably movable relative to the abutment 15 so that a relatively tight fit may be maintained between the edge face 17 of the piston ring and the abutment 15, and between the edge face 18 of the ring and the follower. In order that this tight fit at the edges of the ring may be maintained at all times, I utilize spring pressure for biasing the follower toward the abutment 15 of the piston, so that the edge faces 17 and 18 of the ring are normally maintained in sealing engagement, respectively, with the abutment 15 and the follower 16.

In this instance the follower is shown in the form of a ring which is mounted on the end of the piston body opposite the abutment 15, but it will be understood, of course, that the particular shape of the follower is relatively unimportant and may be other than a ring structure. For mounting the follower on the piston body, I provide the latter with a plurality of studs 19, which extend outwardly from the piston and through openings 20 provided in the follower. Coiled springs 21 disposed around these studs engage the follower and normally bias the latter toward the abutment 15 to thereby take up looseness due to wear or other causes, with the result that a relatively tight fit is always maintained at the edges of the sealing ring. The compression of the springs 21 may be adjusted, by means of the nuts 22 which are threaded on the studs, so that the desired pressure may be maintained on the edge faces of the ring. The nuts may be maintained in the desired position of adjustment by any suitable means, such as the conventional cotter pin 23.

To obtain a compact arrangement, and one wherein the coiled springs 21 are housed and protected, I prefer to provide the follower with enlarged recesses 24 which communicate with the openings 20, and to provide the nuts 22 with similar recesses 25 which open toward, and are substantially aligned with, the recesses of the follower. These cooperating recesses of the nuts and follower form housings in which the coiled springs 21 are disposed, as is clearly illustrated in Fig. 1 of the drawing.

Figure 2:
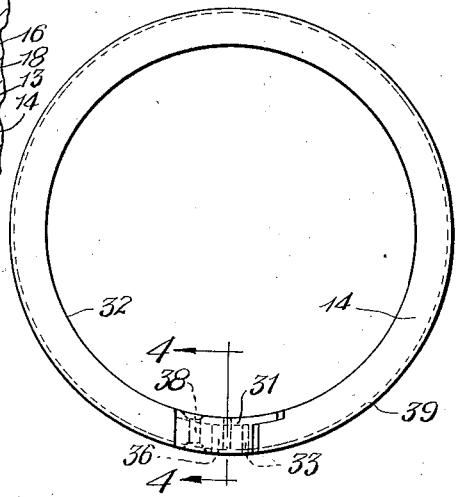
Fig. 2 is a detached plan view of the sealing ring.
Figure 4:
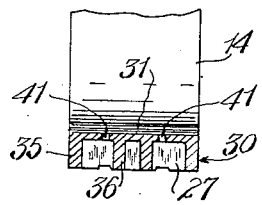
Fig. 4 is a transverse sectional view taken through the ring joint, substantially on line 4—4 of Fig. 2.
Figure 3:
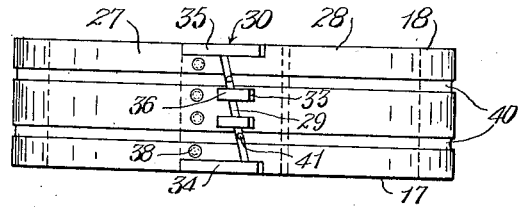
Fig. 3 is a side elevational view of the ring looking toward the joint connecting the ring ends.

In Figs. 2, 3 and 4 I have shown the ring 14 detached from the piston body and, as shown in the drawing, the ends 27 and 28 of the curved body of the ring are in adjacent substantially aligned relation with a clearance space 29 therebetween. The ring itself may be constructed of cast iron or any other suitable material. For maintaining the ends 27 and 28 in properly aligned relation, and for preventing leakage of fluid through the joint, I provide a member 30 which overlaps the joint formed by the ring ends. This member is provided with a body or web portion 31 which is curved to substantially the same radius as the inner surface 32 of the ring, and is recessed into this inner surface as shown in Fig. 2. The ring ends 27 and 28 are each provided with one or more recesses 33 intermediate the edge faces of the ring, which recesses are in substantially aligned relation with, and open toward, each other, as shown in Fig. 3. The member 30 is constructed with integral flange portions 34 and 35 which are recessed, respectively, into the edge faces 17 and 18 of the ring so as to span the joint, and with integral projections 36 which extend outwardly from the web portion 31 into the aligned recesses 33. As shown in Figs. 2 and 3, the member 30 is secured to one of the ring ends, for example the ring end 27, by means of suitable screws or rivets 38, and the portions of this member which overlap the ring end 28 are slidable relative to the latter ring end during expansion or compression of the ring.

As is usual in piston sealing rings, the outer face 39 of the ring 14 may be provided with one or more annular grooves 40, and in accordance with another feature of my invention, I so form the grooves 40 that they communicate with the clearance space 29 between the ring ends. I also provide one or more openings 41 through the web portion of the member 30, so that the clearance space and the grooves 40 are in communication with the annular recess of the piston in back of the ring, through these openings. Heretofore, the sealing ring grooves have been connected with the annular recess back of the ring by means of a number of holes drilled at spaced intervals through the ring. The drilling of these holes has heretofore represented a considerable item of expense, especially in the case of piston rings of large diameter, such as those used on the power pistons of marine engines. By drilling the holes 41 through the joint member 30, which is usually of brass, a material much softer than the cast iron of which the ring is usually constructed, direct communication is provided between the grooves and the piston ring recess through these openings and through the clearance space between the ring ends.

Figure 6:
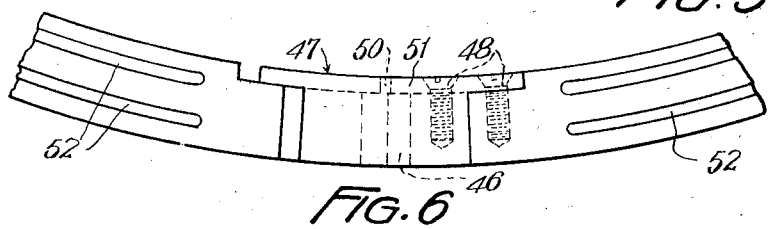
Fig. 6 is a partial plan view thereof.
Figure 5:
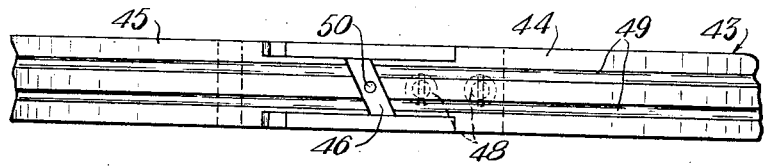
Fig. 5 is a partial elevational view of another sealing ring embodying my invention.

In Figs. 5 and 6 of the drawing I have shown a sealing ring 43 having ends 44 and 45 disposed in adjacent relation with a clearance space 46 therebetween. A joint member 47 is connected to one of the ring ends by means of the screws 48, and overlaps the joint formed by the ring ends. The member 47 is similar to the joint member 30 shown in Figs. 2 and 3, except that the member 47 does not have the integral projections 36. One or more grooves 49 formed in the outer face of the ring 43 communicate with the clearance space 46, and an opening 50 drilled through the web portion 51 of the joint member 47 connects these grooves with the annular piston recess in which the ring may be mounted.

It is usually desirable, although not altogether necessary, that the edge faces of the ring 43 be provided with one or more grooves 52, in which collected fluid serves as a seal and also as a cushion for preventing clicking of the ring against the side walls of the piston ring recess. If desired, the edge faces 17 and 18 of the piston ring 14 may be provided with similar grooves.

It will be readily seen from the drawing that the openings 41 in the ring of Figs. 3 and 4, and the opening 50 in the ring of Figs. 5 and 6, provide a connecting passage between the grooves in the outer faces of the rings and the space behind the rings when the latter are mounted on a piston. The passage provided by these openings permits an equalization of the pressure fluid in the grooves and in the space behind the ring, so that the ring will not be pressed against the cylinder wall with undue force, as might result from an accumulation of pressure fluid behind the ring.

From the foregoing description and accompanying drawing, it should now be readily understood that I have not only provided a novel form of sealing ring, but have also provided novel means for automatically maintaining fluid-tight cooperation between the edge faces of the sealing ring and the side walls of the piston ring recess. The means which I have provided for maintaining this fluid-tight relation at the edges of the ring, automatically takes up looseness resulting from wear or other causes, so that such fluid-tight relation is always maintained and it is not necessary to open the cylinder or valve chest, as the case may be, to make adjustments of the follower to compensate for wear. It will also be readily seen that in the novel form of piston ring which I have devised, the drilling of one or two holes through the relatively soft joint member provides the desired communication between the piston ring grooves and the piston ring recess, without the need of drilling the numerous holes through the body of the ring that have heretofore been provided.

Having thus described my invention, I claim:

1. A sealing ring of the character described comprising a metallic body having the ends thereof in adjacent aligned relation with a clearance space therebetween, said ring having a groove in a face thereof communicating with said clearance space, and a member spanning the joint formed by said ring ends, said member having a pressure fluid equalizing passage therethrough communicating with said clearance space.

2. A sealing ring of the character described comprising a metallic body having the ends thereof in adjacent aligned relation with a clearance space therebetween, said ring having a groove in a face thereof communicating with said clearance space, and a member spanning the joint formed by said ring ends, said member having a body portion recessed into the inner face of the ring and flange portions recessed into the edge faces of the ring, and said member having a pressure fluid equalizing passage extending through said body portion and communicating with said clearance space.

3. A sealing ring of the character described, comprising a metallic body having the ends thereof in adjacent aligned relation with a clearance space therebetween, said ring having a groove in a face thereof communicating with said clearance space, each of said ring ends having a recess therein intermediate the edge faces of the ring and opening toward the recess of the other end, and a member spanning the joint formed by said ends and having a pressure fluid equalizing passage therethrough communicating with said clearance space, said member being recessed into the inner face of the ring and having an outwardly extending projection engaging in the opposed recesses of the ring ends.

4. A sealing ring of the character described, comprising a metallic body having the ends thereof in adjacent aligned relation with a clearance space therebetween, said ring having a groove in a face thereof communicating with said clearance space, each of the ends of said ring having a recess therein intermediate the edge faces of the ring and opening toward the recess of the other end, and a member spanning the joint formed by said ends and having an opening therethrough communicating with said clearance space, said member having a body portion recessed into the inner face of the ring and integral flange portions recessed into the edge faces of the ring, said member also having an outwardly extending projection engaging in the opposed recesses of the ring ends.

5. A sealing ring of the character described, comprising a metallic body having the ends thereof in adjacent aligned relation with a clearance space therebetween, said ring having spaced grooves in a face thereof each communicating with said clearance space, each of the ends of said ring having a recess therein intermediate the said grooves and opening toward the recess of the other end, and a member spanning the joint formed by said ends and being recessed into the inner face of the ring and having an outwardly extending projection engaging in the opposed recesses of the ring ends, said member also having openings on opposite sides of said projection and communicating with said clearance space.

ROBERT I. BODENLOS.